Figure 1:
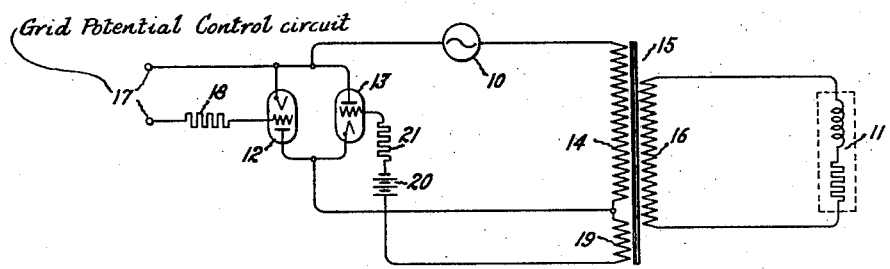

Aug. 14, 1934.    H. W. LORD    1,970,515
ELECTRIC VALVE TRANSLATING CIRCUIT
Filed Nov. 16, 1933

Inventor:
Harold W. Lord,
by Harry E. Dunham
His Attorney.

Patented Aug. 14, 1934

1,970,515

UNITED STATES PATENT OFFICE 1,970,515

ELECTRIC VALVE TRANSLATING CIRCUIT

Harold W. Lord, Schenectady, N. Y., assignor to General Electric Company, a corporation of New York Application November 16, 1933, Serial No. 698,298

REISSUED

7 Claims. (Cl. 171—119)

My invention relates to electric valve translating circuits and more particularly to such circuits in which the amount of current flowing in a circuit is controlled by controlling the conductivity of an electric valve.

Heretofore there have been devised numerous arrangements in which the current flowing in a circuit might be controlled by means of one or more electric valves. In general, at least two electric valves have been most satisfactory. In the case of transmitting current from an alternating current to a direct current circuit, these valves perform the combined function of rectifying and controlling the current. In such cases they are usually connected in a conventional manner for securing full wave rectification. On the other hand, when it is desired to control the current flowing in an alternating current circuit, it is customary to connect a pair of such electric valves reversely in parallel so that each valve conducts half cycles of alternating current of a given polarity. In both of these cases it is customary to excite the control electrodes of the electric valves symmetrically so that each electric valve carries its proportionate part of the load current. This type of control of electric valves has usually been accomplished by means of a control transformer provided with one or more secondary windings connected to the control electrodes of the several electric valves. In the majority of applications involving an appreciable amount of power, the use of valves of the gaseous or vapor electric discharge type has been found particularly favorable because of the relatively large amounts of power which may be handled at ordinary operating voltages, and because of the extremely high efficiency of these valves. Certain of these valves, however, require an appreciable amount of control energy. When the amount of energy available for exciting the control electrodes of the electric valves is extremely small, it sometimes becomes difficult to control satisfactorily a plurality of these valves.

It is an object of my invention, therefore, to provide an improved electric valve translating system which will overcome the above mentioned disadvantage of the arrangements of the prior art, and which will be simple and reliable in operation.

It is another object of my invention to provide an improved electric valve translating system in which the amount of current flowing in the system may be controlled by the electric valves by means of an extremely small amount of control energy.

It is a further object of my invention to provide an improved electric valve translating system in which the amount of current flowing in the system may be controlled by the electric valves by impressing an external control potential on a single one of the electric valves.

In accordance with my invention in its broadest aspects a source of current is interconnected with a load circuit through means including a pair of controlled electric valves. An external control circuit is connected to the control electrode of only one of the electric valves. The other of the electric valves is normally maintained nonconductive, but there is provided means responsive to the conductivity of the first electric valve for rendering conductive the second electric valve. In one embodiment of my invention, this is effected by interconnecting the load circuit with the source through a transformer connected in series with a pair of electric valves reversely connected in parallel. An external control circuit is connected to the control electrode of one of the valves, while the control electrode of the other valve includes a negative bias battery and an auxiliary winding of the transformer. When current flows in the valve controlled from the external circuit, a voltage is induced in the auxiliary winding of the transformer of proper polarity to render conductive the second electric valve. In accordance with another embodiment of my invention, a current transformer is connected in series with a pair of electric valves reversely connected in parallel, which, in turn, interconnects the source with the load circuit. An external control circuit is connected to the control electrode of one of the valves, while the control electrode of the other valve is excited with the output of the current transformer and a negative bias battery.

For a better understanding of my invention, together with other and further objects thereof, reference is had to the following description taken in connection with the accompanying drawing, and its scope will be pointed out in the appended claims. In the drawing, Fig. 1 diagrammatically illustrates my invention as applied to a system for transmitting energy from a single phase alternating current supply circuit to a single phase alternating current load circuit, while Fig. 2 illustrates a modification of the arrangement of Fig. 1 which eliminates the use of a power transformer.

Referring now more particularly to Fig. 1 of the drawing, there is shown a system for transmitting energy from a single phase alternating current source 10 to an alternating current load circuit 11, illustrated diagrammatically as comprising inductance and resistance. This system includes a pair of electric valves 12 and 13 reversely connected in parallel and interconnecting the source 10 and the primary winding 14 of a transformer 15, the secondary winding 16 of which is connected to the load circuit 11. Electric valves 12 and 13 are each provided with an anode, a cathode and a control electrode or grid and may be of any of the several types well known in the art, although I prefer to use valves of the vapor or gaseous electric discharge type. The conductivity of the electric valve 12 is adapted to be controlled from an external control circuit 17 through a current limiting resistor 18 in any of the several well known manners. The grid of the electric valve 13 is energized from a control circuit including an auxiliary winding 19 of the transformer 15, a negative bias battery 20 and a current limiting resistor 21.

In considering the operation of the above described apparatus, it will be assumed that initially the electric valve 12 is maintained nonconductive by its external control circuit 17. Under these conditions, no voltage is impressed upon the primary winding 14 of the transformer 15 so that no voltage is induced in the auxiliary winding 19 and electric valve 13 is maintained nonconductive by its negative bias battery 20. If electric valve 12 is rendered conductive by its external control circuit 17, current will flow through the transformer 15 to the load circuit 11 during the particular half cycle in which the anode of the electric valve 12 is positive. This current will continue to flow, however, for an interval even after the voltage of the supply source 10 reverses polarity because of the inductance in the load circuit 11. When the voltage impressed upon the primary winding 14 of the transformer through the electric valve 12 reverses polarity, the voltage induced in the winding 19 will likewise reverse polarity, and this is connected to the grid of the electric valve 13 with such a phase relation that it is positive during the half cycles succeeding those in which electric valve 12 is conductive; that is, it is approximately in phase with the anode potential of electric valve 13. Thus, electric valve 13 is rendered conductive to carry current during its respective half cycles of positive anode potential, and alternating current is supplied to the load circuit 11. Current will continue to flow as long as electric valve 12 is rendered conductive by its external control circuit 17. As soon as electric valve 12 is no longer maintained conductive, however, current will be interrupted in the primary winding 14 of the transformer 15, no potential will be induced in the winding 19 and electric valve 13 will be maintained nonconductive by its negative bias battery 20. The circuit of Fig. 1 will operate only with inductive loads, although in some cases the exciting impedance of the transformer 15 may be sufficient for satisfactory operation.

Figure 2:
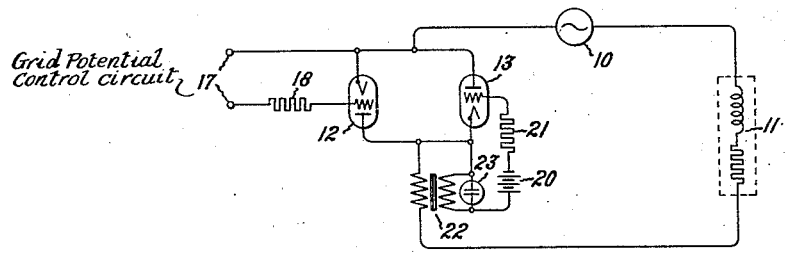

The arrangement of Fig. 2 is similar in many respects to that of Fig. 1. In this case, the excitation of the electric valve 13 includes the secondary winding of a current transformer 22, the primary winding of which is connected in series with the parallel connected valves 12 and 13. The control circuit of the valve 13 also includes a negative bias battery 20 and a current limiting resistor as in the arrangement of Fig. 1. If desired, a constant voltage device, such as a glow lamp 23, may be connected across the secondary winding of the current transformer 22 in order to limit the amplitude of the voltages induced in the secondary winding. The operation of this circuit is similar to that of Fig. 1. As long as the electric valve 12 is maintained nonconductive by its external control circuit 17, no potential is induced in the secondary winding of the current transformer 22 and electric valve 13 is maintained nonconductive by the negative bias battery 20 in its grid circuit. When electric valve 12 is rendered conductive by its external control circuit 17, however, this current flows through the primary winding of the current transformer 22. The connections are such that, upon the interruption of this current in the primary winding of the current transformer 22 at the end of the half cycle of alternating current, the potential induced in the secondary winding is of such a polarity as to overcome the negative bias of the battery 20 and to render electric valve 13 conductive. In this manner, alternating current is supplied to the load circuit 11 only during those intervals in which electric valve 12 is rendered conductive by its external control circuit 17. The circuit of Fig. 2 will operate with inductive or unity power factor loads.

While I have described what I at present consider the preferred embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States, is:

1. An electric valve translating circuit comprising a source of alternating current, an alternating current load circuit, means including a pair of controlled electric valves connected to control the current transmitted from said source to said load circuit, an external control circuit connected to the control electrode of only one of said valves for controlling the conductivity thereof, means for normally maintaining the other valve nonconductive and for controlling the conductivity of said other valve in response to the conductivity of said first mentioned valve.

2. An electric valve translating circuit comprising a source of alternating current, an alternating current load circuit, a pair of controlled electric valves reversely connected in parallel and interconnecting said source and said load circuit, an external control circuit connected to the control electrode of only one of said valves for controlling the conductivity thereof, means for impressing a negative bias on the control electrode of the other of said valves to maintain it normally nonconductive, and means for controlling the conductivity of said other valve in response to the conductivity of said first mentioned valve.

3. An electric valve translating circuit comprising a source of alternating current, a load circuit, means including a pair of controlled electric valves connected to control the current transmitted from said source to said load circuit, an external control circuit connected to the control electrode of only one of said valves for controlling the conductivity thereof, means for impressing upon the control electrode of the other of said valves a negative bias potential to maintain it normally nonconductive, and means responsive to the conduction of current by said first mentioned valve for impressing upon the control electrode of said other valve an alternating potential substantially in phase with its anode potential.

4. An electric valve translating circuit comprising a source of alternating current, a load circuit, means including a serially connected transformer and a pair of controlled electric valves interconnecting said source and said load circuit, said valves being reversely connected in parallel, an auxiliary winding for said transformer, an external control circuit connected to the control electrode of only one of said valves for controlling the conductivity thereof, and a control circuit for the control electrode of the other of said valves including a source of negative bias potential and said auxiliary transformer winding.

5. An electric valve translating circuit comprising a source of alternating current, a load circuit, means including a pair of controlled electric valves connected to control the current transmitted from said source to said load circuit, an external control circuit connected to the control electrode of only one of said valves for controlling the conductivity thereof, means for impressing upon the control electrode of the other of said valves a negative bias potential to maintain it normally nonconductive, and means responsive to the interruption of current in said first mentioned valve for impressing a positive impulse upon the control electrode of said other valve.

6. An electric valve translating circuit comprising a source of alternating current, a load circuit, means including a pair of controlled electric valves connected to control the current transmitted from said source to said load circuit, an external control circuit connected to the control electrode of only one of said valves for controlling the conductivity thereof, a current transformer connected in series relation with the current of said controlled valve, and a control circuit for the control electrode of the other of said valves including a source of negative bias potential and a winding of said current transformer.

7. An electric valve translating circuit comprising a source of alternating current, an alternating current load circuit, a pair of controlled electric valves reversely connected in parallel and interconnecting said source and said load circuit, a current transformer connected in series with said pair of valves and provided with an output winding, a constant voltage device connected across said output winding, an external control circuit connected to the control electrode of only one of said valves for controlling the conductivity thereof, and a control circuit for the control electrode of the other of said valves including a source of negative bias potential and the output winding of said current transformer.

HAROLD W. LORD.